Feb. 26, 1924.
H. C. MALLORY
1,485,233
EXPANSIBLE COLLAPSIBLE ELEMENT AND METHOD OF PRODUCING THE SAME
Original Filed April 22, 1914
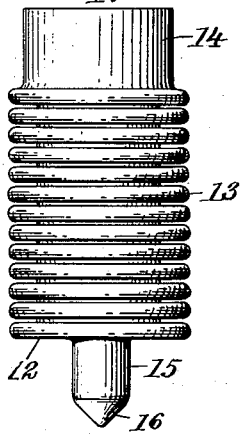
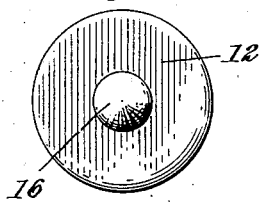
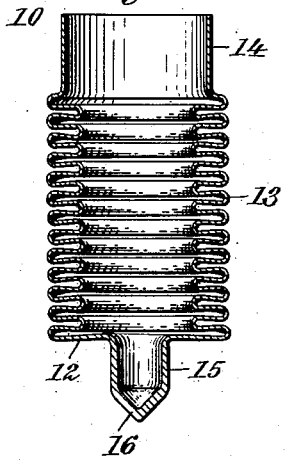
Inventor
Harry C. Mallory
By Conrad A. Dieterich
his Attorney

Patented Feb. 26, 1924.

1,485,233

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

EXPANSIBLE-COLLAPSIBLE ELEMENT AND METHOD OF PRODUCING THE SAME.

Original application filed April 22, 1914, Serial No. 833,593 (now Patent No. 1,366,473 dated January 25, 1921). Divided and this application filed August 31, 1920. Serial No. 407,208.

*To all whom it may concern:*

Be it known that I, HARRY C. MALLORY, a citizen of the United States, residing at Bellport, Suffolk County, in the State of New York, have invented certain new and useful Improvements in Expansible - Collapsible Elements and Methods of Producing the Same, of which the following is the full, clear, and exact specification.

My invention relates to elastic elements, and the same has for its object more particularly to provide an elastic metallic element for use in connection with apparatus or devices subject to or influenced by temperature or pressure variations, whereby to operate a valve, apparatus or other mechanism.

Further, said invention has for its object to provide an expansible-collapsible element comprising a circumferentially corrugated body portion, and a closed end terminating in a reduced end serving as a valve, or as a part to permit of the attaching of a valve or other element thereto.

Further, said invention has for its object to provide an expansible-collapsible element formed as an integral, unitary structure comprising a shell having a circumferentially corrugated body portion and a closed end of greater thickness than said body portion. The closed end comprises a reduced cylindrical portion pressed, spun or otherwise developed from said closed end and provided with a head of appropriate form to meet the requirements of the service which the device is intended to perform.

Further, said invention has for its object to provide a simple, practical and inexpensive method of producing an expansible-collapsible element of the character specified.

Other objects will in part be obvious, and in part be pointed out hereinafter.

To the attainment of the aforesaid objects and views my invention consists in the novel details of construction, and in the combination, connection and arrangement of parts, and in the several steps constituting the method hereinafter more fully described, and then pointed out in the claims.

In the accompanying drawings forming part of this specification wherein like numerals of reference indicate like parts, Figure 1 is a side elevation showing one form of expansible-collapsible element constructed according to, and embodying my said invention;

Fig. 2, is a bottom view thereof, and

Fig. 3, is a central vertical sectional view.

In said drawings 10 designates a cylindrical shell having a thin side wall 11, and a closed end 12, preferably made of greater thickness than said side wall 11.

The intermediate or body portion of said shell 10 is circumferentially corrugated to form a series of corrugations or folds 13. At its open end the shell is provided with an annular band 14 to permit of the convenient attachment of the same to another co-operating part or element, as desired, such, for example, as shown at Fig. 1 of applicant's Patent No. 1,366,473, dated January 25, 1921, of which this application is a division. The closed end of the shell, which is materially thicker than said corrugated intermediate portion, has its central portion pressed by suitable dies or spun to form an integral reduced, cylindrical projection 15 of substantially the same thickness as the end 12 from which it is formed, and in the present instance, said projection 15 is shown terminating in a conical head 16, which is designed to act as a valve member to seat upon a valve seat when said corrugated body portion of the shell is expanded mechanically or automatically when the expansible-collapsible element forms part of a thermosensitive or pressure sensitive apparatus or device.

In constructing the expansible-collapsible element herein shown and described, the reduced, cylindrical projection 15 may be formed before the body portion of the shell is corrugated, or after the same has been subjected to the corrugating operation, as may be found most convenient or desirable.

It will be noted that an expansible-collapsible element constructed as herein shown and described is made entirely as an integral, unitary structure, and therefore requires no assembling, and, further, as the device requires no assembling or hand work the same becomes practically a standardized machine-made product.

Having thus described my said invention, what I claim and desire to secure by Letters Patent is:

1. A device of the character described comprising a shell having a circumferentially corrugated body portion and a closed end, said closed end comprising a projection of smaller diameter than the remaining portion of said closed end and formed from said end, and a conical head at the outer end of said projection, substantially as specified.

2. A device of the character described, comprising a shell having a circumferentially corrugated body portion and a closed end integral therewith of relatively greater thickness than said body portion, said closed end comprising a projection extending centrally thereof, and a conical head at the outer end of said projection constituting a valve face, substantially as specified.

3. A device of the character described formed as an integral, unitary structure formed from a cylindrical shell comprising a circumferentially corrugated body portion and a closed end of greater thickness than said corrugated body portion, said closed end comprising a hollow, cylindrical member extending centrally thereof and terminating in a conical head constituting a valve face, substantially as specified.

4. The process of making a device of the character described which consists in forming from a blank a shell having a flexible body portion and a closed end, and then forming a valve member integrally with said closed end, substantially as specified.

5. The process of making a device of the character described which consists in forming from a blank a shell having a circumferentially corrugated body portion and a closed end, and then forming a valve member of smaller diameter than said closed end extending centrally therefrom, substantially as specified.

6. The process of making a device of the character described which consists in forming from a blank a shell having a circumferentially corrugated body portion, and a closed end of relatively greater thickness than the wall of said body portion, and then forming from said closed end a hollow cylindrical member of smaller diameter than that of said closed end, and a conical head at the outer end of said cylindrical member, substantially as specified.

7. The process of making an integral device of the character described which consists in forming from a blank a cylindrical shell having a circumferentially corrugated body portion and a closed end of relatively greater thickness than the wall of said corrugated portion, and a hollow, cylindrical member of reduced diameter extending centrally of said closed end and terminating in a conical head constituting a valve face, substantially as specified.

Signed at the city of New York, New York County, in the State of New York, this first day of June, one thousand nine hundred and twenty.

HARRY C. MALLORY.

Witnesses:
CONRAD A. DIETERICH,
IRENE V. BANNIN.